United States Patent Office 3,381,295
Patented Apr. 30, 1968

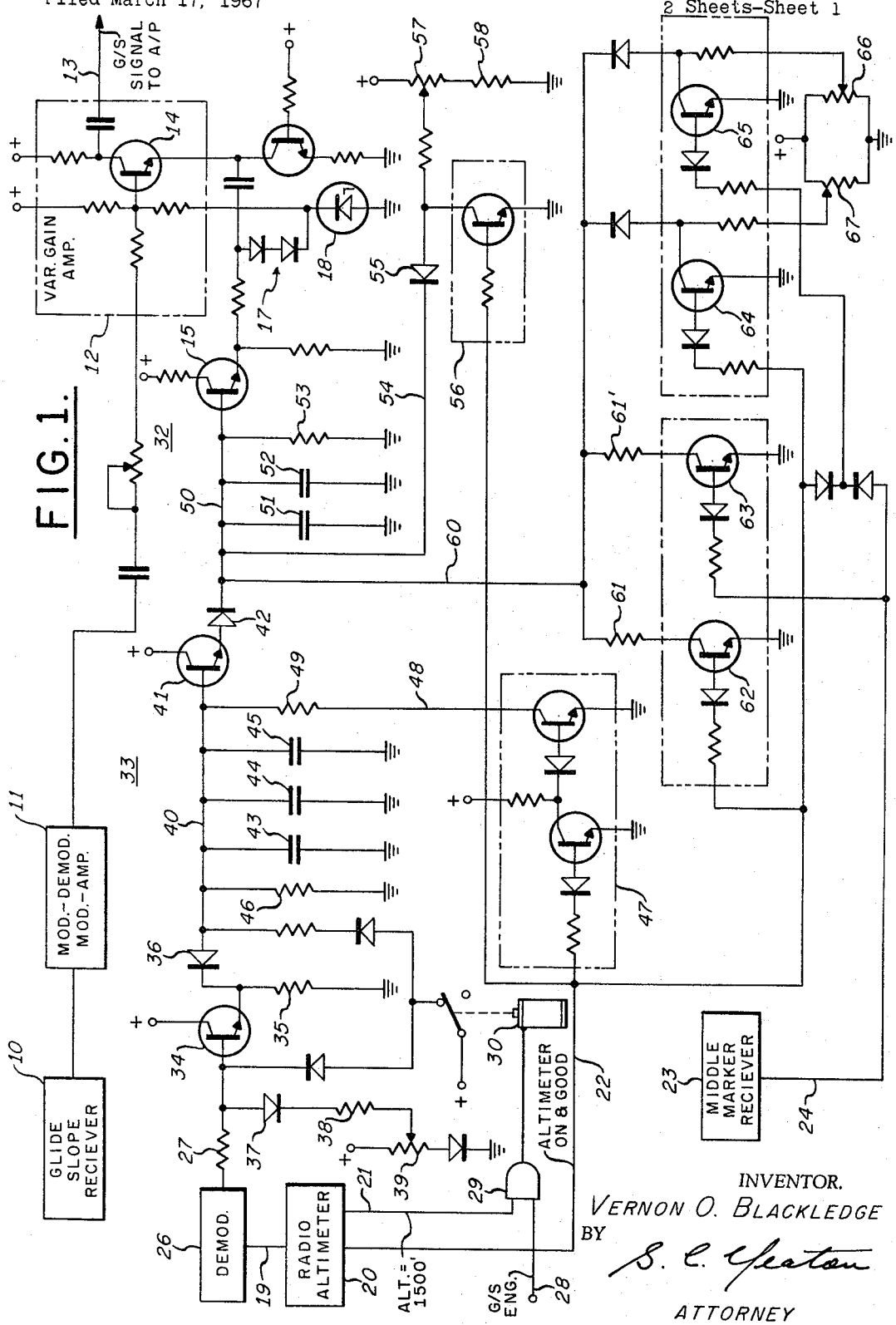

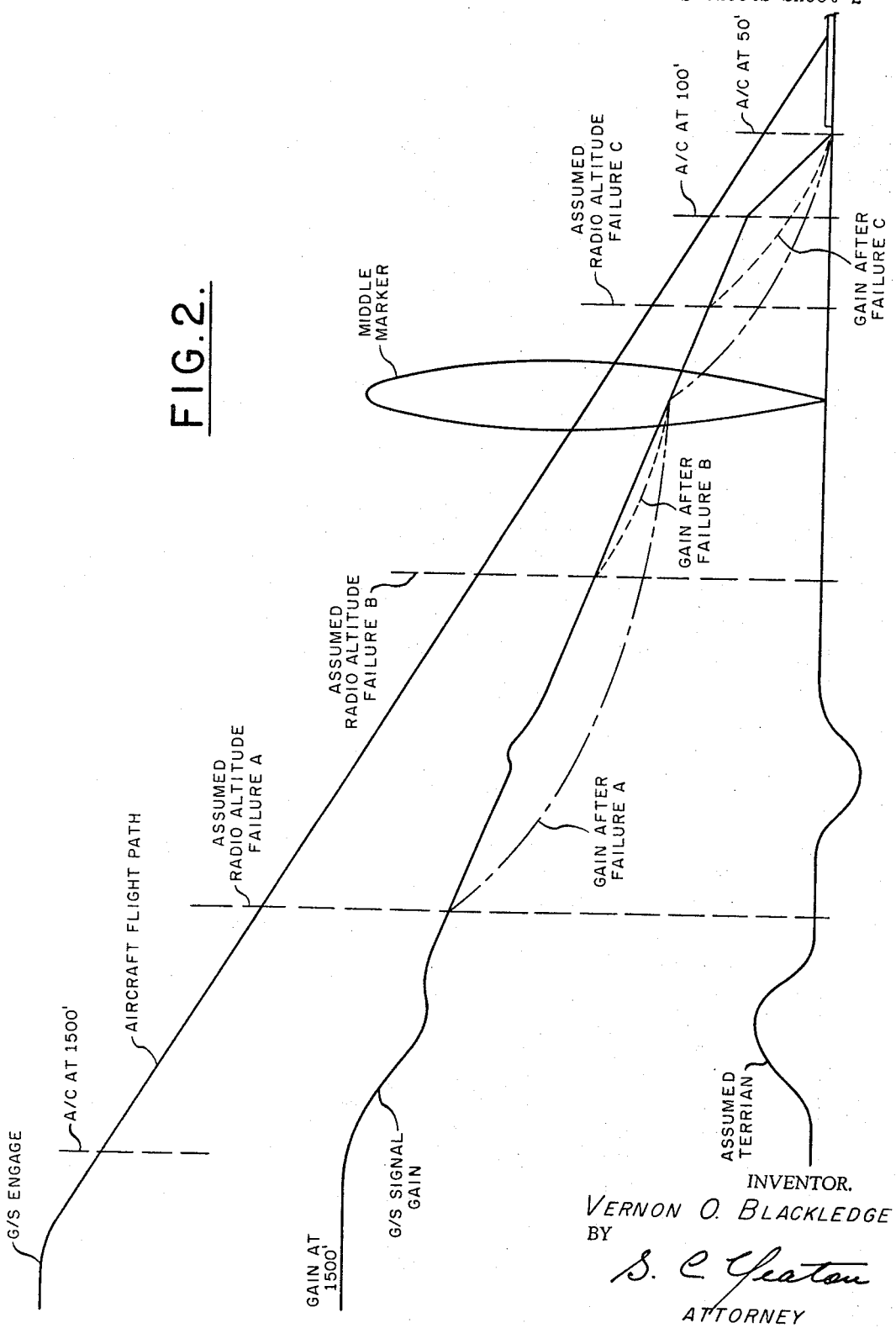

3,381,295
RADIO CONTROLLED GUIDANCE APPARATUS FOR AIRCRAFT HAVING RADIO SIGNAL GAIN PROGRAMING
Vernon O. Blackledge, Phoenix, Ariz., assignor to Sperry Rand Corporation, a corporation of Delaware
Filed Mar. 17, 1967, Ser. No. 623,890
6 Claims. (Cl. 343—108)

ABSTRACT OF THE DISCLOSURE

Glide slope control apparatus for aircraft autopilots having gain programing for course softening purposes wherein the gain of the glide slope control signal is decreased in accordance with a signal proportional to radio attitude; but should the altitude signal fail, gain reduction continues but is based on time. The time program is achieved by controlled capacitance discharge which before altimeter failure, is "slaved" to the altitude signal. At the ILS "window" (altitude about 100 feet and within which the craft may continue the approach), the altitude controlled gain is sharply reduced so that it is substantially zero at the flare altitude (50 feet), while with time based gain programing, the gain is reduced at an increased rate when the craft is at the middle marker beacon. The radio altitude gain control signal is compensated for abnormal decreases or increases due to topography along the approach path by controlling, through suitably biased diode, capacitance discharge normally similarly "slaved" to the altitude signal.

Background of the invention

The present invention relates to improvements in aircraft automatic pilot approach coupler apparatus and may also be applicable in flight director computers which drive panel mounted flight instruments. More specifically, the invention relates to improvements in such apparatus wherein the gain of the primary radio displacement control signal is varied, i.e., reduced, generally in accordance with the distance of the aircraft from the radio transmitter for course softening purposes. Such course softening is required to compensate for the increase in beam intensity and any beam irregularities as the aircraft approaches the radio transmitter.

The present invention is disclosed herein as being applied to vary the glide slope radio signal gain of an ILS although it will be understood that the principles disclosed may be similarly applied to the ILS localizer beam and VOR beams.

Gain programing in general is well established in the prior art and it is known that a signal proportional to the altitude of the aircraft as it proceeds along glide slope beam is a signal that is generally proportional to the distance between the aircraft and the glide slope transmitter. More specifically, it has been proposed in the past to use a direct measure of the aircraft above terrain as provided by a radio altimeter as a source of the altitude signal. The altitude signal is used, therefore, to vary gain of the glide slope control signal. It is also known in the prior art to vary the gain of the glide slope signal as a function of time, i.e., assuming that the aircraft follows closely the glide slope beam at a known air speed. Such time programing has been provided by electromechanical means or by electronic means.

Summary of the invention

The present invention provides apparatus whereby the radio beam signal gain is normally varied as a function of a measured quantity proportional to the distance between the aircraft and the radio transmitter but wherein should such a measure fail, gain programing continues to be provided but based on time rather than on the distance measure. In accordance with the invention means for providing the time signal is kept "up to date" with the distance signal through a means which "slaves" the timing signal to the distance signal. This technique ensures that the time-based control signal is initiated from the last "good" distance measure. The advantage of such a system is that it provides a redundancy so important in automatic or semi-automatic low-weather radio controlled approach systems.

In accordance with another aspect of the present invention the glide slope gain programing as a function of radio altitude varies in accordance with a pretermined ratio of signal magnitude to altitude from its initiatng altitude of about 1500 feet to about 100 feet of altitude at which point the ratio is changed so that from about 100 feet to the flare altitude of about 50 feet the gain control signal is rapidly reduced to substantially zero. The purpose of this is to satisfy a requirement that the aircraft be within a predetermined "window" at 100 feet of altitude, i.e., if the aircraft displacement with respect to the glide slope (and LOC) beam is within specified limits, the aircraft may continue its approach, otherwise it must abort. Therefore, in order to provide tight path control, the radio signal gain is maintained at a finite value until the window is reached at which time the gain is abruptly reduced to zero between the window altitude and the flare altitude.

For time-based radio signal gain programing, the gain is reduced in accordance with a first time characteristic from an initial level at the point of initiation to a first predetermined lower gain level at the ILS middle marker. At the middle marker, interlock switching occurs which reduces the gain in accordance with a different time characteristic to substantially zero gain level at or near the runway threshold.

Description of the drawings

A preferred embodiment of the present invention is described below in connection with the accompanying drawings wherein FIG. 1 is a schematic wiring diagram of the gain programing apparatus constructed in accordance with the teaching of the present invention and FIG. 2 is a diagram representing the flight path of the aircraft and the gain control characteristics provided by the circuit of FIG. 1.

Description of the preferred embodiment

Referring now to FIG. 1 wherein the principles of the present invention are illustrated as being employed for varying the gain of an ILS glide slope control signal for controlling the pitch axis of an aircraft automatic pilot or flight director system during an ILS approach. Glide slope receiver 10 provides an output proportional to the vertical displacement of the aircraft from the glide slope beam transmitted from the glide slope transmitter (not shown) located at the vicinity of the runway threshold.

The D.C. output signal of the receiver is suitably shaped and modulated at 11 and applied to a variable gain amplifier 12 the output 13 of which is applied to the pitch channel of an automatic pilot radio coupler which may be of the character disclosed in U.S. Patent No. 3,116,899 assigned to the same assignee as the present invention. Variable gain amplifier 12 comprises a transistor 14 the output gain of which is controlled, through transistor 15, by the A.C. impedance-to-ground seen by the emitter of transistor 14. The A.C. gain of variable gain amplifier 12 is an inversed function of the emitter impedance-to-ground which in turn is an inversed function of the D.C. current through diodes 17 and 18. This gain variation is directly related to the control voltage at the base of transistor 15.

Normally, the glide slope signal gain is varied as a direct function of the instantaneous distance between the aircraft and the transmitter. Referring to FIG. 2, it may be assumed that the aircraft is approaching the runway along the glide slope path at a substantially constant speed and, therefore, the instantaneous altitude of the aircraft above the ground is a directly measurable quantity proportional to the distance or range of the aircraft from the transmitter. In the present embodiment, the altitude signal is derived from a conventional radio altimeter 20 which provides at its output 19 an A.C. signal which varies in phase and amplitude directly in accordance with the instantaneous altitude of the aircraft as it approaches the runway. For the purposes described below, the radio altitude also provides certain interlock signals for controlling the operation of the apparatus, one of these being a trip signal on lead 21 supplied when the aircraft is at an altitude of 1500 feet above the terrain and the other being a signal on lead 22 supplied whenever the altimeter is "on" and "good," i.e. working properly. Upon engaging the glide slope control mode of autopilot operation, another interlock signal is applied at lead 28 which together with the 1500 foot trip signal on lead 21 is applied to "and" circuit 29 which supplies an energizing signal to relay 30 which in effect turns on the control circuit of the present invention. A further interlock signal is provided by middle marker receiver 23 when the aircraft passes over the ILS middle marker, this output appearing on lead 24. The A.C. output of radio altimeter 20 is applied to a demodulator 26 which supplies at its output 27 a D.C. control signal proportional in sense and magnitude to the instantaneous altitude of the aircraft as it proceeds along the glide slope path.

The gain program apparatus of the present invention comprises generally a gain program circuit 32 and a gain program controller 33. The controller comprises a transistor 34 having its collector energized from a source of D.C. voltage and its emitter coupled to a branch circuit, one branch of which comprises resistance 35 to ground and the other branch of which is connected to the cathode of a diode 36. The base of transistor 34 is connected to the D.C. output of the radio altimeter 20. The diode 37 couples the output of demodulator 26 to a suitable source of bias voltage through resistor 38 and potentiometer 39.

The anode of diode 36 is coupled via lead 40 to the base of a transistor 41 the collector of which is connected to a suitable source of D.C. supply voltage and the emitter of which is coupled to the anode of a diode 42 of gain program circuit 32. Connected in parallel between lead 40 and ground are plurality of capacitances 43, 44, and 45 and a resistance 46. If the altimeter 20 is on and operating properly, an interlock voltage appears on lead 22 and is supplied to the base of a transistor switch 47 which functions to maintain lead 48 and resistance 49 open circuited so that resistance 49 has no effect on the base circuit of transistor 41.

Prior to glide slope engagement and altitude greater than 1500 feet, relay 30 will be deenergized and 30 volts will be applied to the lead 40 to initially charge condensers 43, 44, and 45 to this voltage. Upon the aircraft reaching 1500 feet with the glide slope engaged, relay 30 will open allowing condensers 43, 44, and 45 to begin to discharge through resistance 46 and thereby tend to decrease the voltage output of transistor 41 exponentially with time. The time constant may be on the order of 300 seconds. With the aircraft at 1500 feet, the D.C. control input at the base of transistor 34 is +30 volts (through relay 30) and therefore the anode of diode 36 is likewise maintained at 30 volts D.C. However, since the aircraft is descending along the glide slope beam when relay 30 becomes energized, the D.C. control voltage of the output of radio altimeter 20 is likewise decreasing with altitude and the cathode potential on the diode 36 starts to decrease. This allows condensers 43, 44, and 45 to discharge more rapidly through resistance 35 than resistance 46 alone would allow. By this means, the condenser voltage is caused to follow the radio altitude signal and hence the output of transistor 41 similarly decreases with radio altitude which, through transistor 15 and variable gain amplifier 12, produces a corresponding reduction in gain of the glide slope control signal to the autopilot.

Should the aircraft pass over a depression in the ground as shown in FIG. 2, the radio altimeter signal would indicate an altitude increase. This increase will drive the cathode of diode 36 positive relative to its anode so that condensers 43, 44, and 45 discharge only through resistance 46. Therefore, the output of controller 33 will not increase with this apparent increase in altitude and will continue to decrease just as it should do since the aircraft has not actually changed its flight path. When the ground depression is passed, the output of the radio altimeter reestablishes the discharge path through resistance 35 to reestablish the normal discharge rate so as to follow the radio altitude signal. Conversely, if the aircraft passes over a hill thereby indicating an altitude decrease, the output of controller 33 will likewise decrease below the ideal value but once the hill is passed, this output recovers to its proper value when the radio signal decreases below the controller output voltage. This ratcheting-type control is illustrated schematically in FIG. 2. If for some reason the altimeter should fail, loss of the altimeter interlock voltage on lead 22 will actuate transistor switch 47 to ground the lead 40 and hence turn off transistor 41 through resistance 49 and a time program will be automatically established as will be described below.

As started, the radio gain control signal from transistor 41 is applied to the base of transistor 15, this connection being indicated by lead 50. Connected to lead 50 are a pair of capacitances 51 and 52 arranged in parallel to ground along with a resistance 53 similarly connected from lead 50 to ground. A further lead 54 connects lead 50 through diode 55 to ground through transistor switch 56 which, if the altimeter is functioning properly, is energized by the altimeter "good" signal on lead 22. This switch under the same condition also serves to ground the 30 volt source applied across potentiometer 57 and resistance 58. Connected to lead 50 is a lead 60 which serves to connect a resistance 61 in series to ground through transistor switch 62 similarly maintained "on" by the altimeter "good" interlock voltage on lead 22. Lead 60 also serves to connect further resistance 61' to ground through a further transistor switch 63 under conditions to be hereinafter described. For purposes likewise to be described below, two different values of voltage are applied to lead 50 through lead 60 whenever transistor switches 64 and 65 are deenergized.

During normal altimeter gain programing, condensers 51 and 52 will tend to be charged through the voltage on lead 50 and will also tend to be discharged through resistance 53 to ground. With the altimeter operating properly, transistor switch 62 is turned on and resistance 61 provides an additional discharge path for condensers 51 and 52. This additional discharge path serves to slave the charge on the condensers 51 and 52 to the radio altimeter gain control voltage on lead 50.

Referring to FIG. 2, it will be noted that at 100 feet of altitude, the gain control voltage is caused to drop sharply to zero between 100 feet and 50 feet of altitude. This provides a desired finite glide slope signal gain at the ILS "window" thereby providing tight displacement control of the aircraft, but since it is desired that the glide slope gain be negligible or zero at the initiation of the flare maneuver, the gain is reduced more abruptly between the "window" and the flare altitude. This sharp gain reduction is accomplished by the attenuation network including diode 37, resistance 38 and potentiometer 39. At 100 feet of altitude, the voltage on the anode of diode 37 decreases below the predetermined back bias applied to its cathode from the voltage source and potentiometer 39 and resistance 38 thereby causing the diode to cease to conduct. This in effect increases the voltage gradient of the output of the programer 33 below 100 feet. In order that the discharge of condensers 51 and 52 be allowed accurately to follow this change in altitude signal gradient, an additional resistance 61' is connected in parallel with resistance 61 through energization of transistor switch 63. This transistor is turned on when the aircraft passes over the middle marker beacon and receiver 23 supplies an output on lead 24.

In accordance with the teaching of the present invention gain programing continues if the radio altimeter 20 should fail but based on time rather than on altitude. Referring to FIG. 2, radio altimeter 20 is assumed to have failed at point A or at point B or at point C along the glide slope path. If it failed at point A, for example, the altimeter "good" output on lead 22 goes to zero thereby switching off the gain program controller 33 as described above and simultaneously turning off transistor switch 62, thereby removing the discharge path through resistor for condensers 51 and 52; i.e., the "slaving" is rendered ineffective. Simultaneously, transistor switch 56 will be open so that condensers 51 and 52 will now discharge through resistance 53 and resistance 58. The values of resistance are selected such that the gain after radio altimeter failure will be generally as illustrated by the dot dash curve of FIG. 2 which gain program generally corresponds to that provided by the radio altimeter but being non-linear rather than linear. The minimum voltage to which the condensers 51 and 52 may be allowed to discharge to is set by the voltage supplied from a source through potentiometer 66. This voltage may be selected to correspond to the gain normally obtaining at the middle marker when under the altitude gain program. At the middle marker, transistor switch 65 is energized thereby shorting potentiometer 66 to ground. Also transistor switch 63 will be energized thereby providing a further discharge path for condensers 51 and 52 through resistance 61'. The component values are such that at the middle marker this discharge rate is more rapid than it was prior to reaching the middle marker. This is provided by potentiometer 67 which now determines a lower level to which condensers 51 and 52 may discharge, normally being preset to provide substantially zero gain through variable gain amplifier 12.

Should the altimeter fail at assumed point B along the glide slope path, the operation is identical as described above but since the charge on condensers 51 and 52 is slaved to the radio signal, the voltage difference between that obtaining at altimeter failure and the support voltage provided by potentiometer 66 and 67 the slope of the gain control voltage curve will be shallower than it was when failure occurred at point A. Should the radio altimeter fail at point C along the glide path, i.e., after the middle marker has been passed, the discharge rate of the condensers 51 and 52 will be as illustrated by the curve C since switch 65 is now energized, shorting out the support voltage from potentiometer 66.

It should be noted that should the radio altimeter fail prior to glide slope engagement or if there is no altimeter installed in the aircraft, the gain programmer 32 alone may be used. For this purpose a two step time programing is provided. Prior to glide slope engagement, switch 56 is deenergized and condensers 51 and 52 will be charged to a voltage determined by the voltage from potentiometer 57 which may be the same as that provided by the rado altimeter at the initiation of gain programing. The gain program may be initiated by glide slope engagement and by a suitable interlock voltage which may be substituted for the 1500 foot interlock voltage on lead 21 at a predetermined time after glide slope engagement. This interlock voltage may shunt the voltage at potentiometer 57 to ground and thereby allow capacitors 51 and 52 to discharge through resistance 53 to a first voltage value set by potentiometer 66 and 67 prior to the middle marker. At the middle marker, switch 65 is turned on which shorts potentiometer 66 with output to ground thereby providing a further decay of the condenser voltage until it settles at a final value determined by potentiometer 67. The different rate of decay after passing the middle marker is achieved by switch 63 which inserts resistance 61' into the discharge path for the condensers 51 and 52.

While the invention has been described in its preferred embodiments, it is to be understood that the words which have been used are words of description rather than limitation and that changes within the purview of the appended claims may be made without departing from the true scope and spirit of the invention in its broader aspects.

I claim:
1. In radio coupler apparatus for an aircraft guidance control system wherein the course of the aircraft is controlled in accordance with a signal derived from a transmitted radio beam, apparatus for controlling the gain of the radio course signal for course softening purposes comprising:
   (a) variable gain control means for coupling said radio course control signal to said guidance system,
   (b) means providing a signal variable in accordance with a measured quantity proportional to the distance between the aircraft and the radio transmitter,
   (c) means responsive to said distance signal for controlling said variable gain means in accordance therewith,
   (d) timing means adapted to supply a signal having a variation with time generally corresponding to the variation of said distance signal,
   (e) means coupled with said timing means for slaving said timing means to said distance signal,
   (f) and means responsive to a failure of said distance signal means for rendering said distance signal providing means and said slaving means ineffective and for rendering said timing means effective to control said variable gain control means.

2. The apparatus as set forth in claim 1 wherein said timing means comprises capacitance means coupled with said distance signal and said variable gain control means, and normally maintained charged to a voltage value corresponding to said distance signal and including a discharge impedance path for providing a voltage variation with time generally corresponding to said distance signal.

3. The apparatus as set forth in claim 2 wherein said slaving means comprises means providing an additional discharge impedance path for said capacitance means whereby the voltage charge on said capacitance means closely follows the instantaneous value of said distance signal.

4. The apparatus as set forth in claim 2 wherein said failure responsive means comprises switch means for rendering said additional impedance path ineffective and said first mentioned impedance path effective.

5. The apparatus as set forth in claim 1 wherein said distance signal varies in accordance with said measured quantity in a first predetermined ratio, and further including means responsive to a predetermined value of said measured quantity for changing said ratio to a second predetermined value, and wherein said slaving means further includes means responsive to a predetermined distance between the aircraft and the transmitter for varying the slaving rate thereof whereby to ensure slaving of said timing signal to said changed distance signal.

6. The apparatus as set forth in claim 1 wherein said transmitted radio beam is an instrument landing system glide slope beam and wherein said distance signal providing means comprises an altimeter.

References Cited

UNITED STATES PATENTS

| | | | |
|---|---|---|---|
| 2,309,314 | 1/1943 | Harshaw | 343—108 |
| 2,498,730 | 2/1950 | Williams | 343—108 |
| 2,987,275 | 6/1961 | Moncrieff-Yeates | 343—108 |
| 3,189,905 | 6/1965 | Battle | 343—108 |
| 3,335,980 | 8/1967 | Doniger et al. | 244—77 |

RODNEY D. BENNETT, *Primary Examiner.*

H. C. WAMSLEY, *Assistant Examiner.*